(12) United States Patent
Fan et al.

(10) Patent No.: US 8,849,310 B2
(45) Date of Patent: Sep. 30, 2014

(54) EVENT BASED SERVICE

(75) Inventors: James Fan, San Ramon, CA (US); David Feng-Lin Chen, Fremont, CA (US); Richard Kuo, Mountain View, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 448 days.

(21) Appl. No.: 12/963,467

(22) Filed: Dec. 8, 2010

(65) Prior Publication Data

US 2012/0149396 A1    Jun. 14, 2012

(51) Int. Cl.
  *H04W 64/00*    (2009.01)
  *G06Q 30/02*    (2012.01)
  *H04W 4/02*    (2009.01)
  *H04W 4/20*    (2009.01)
  *H04W 4/10*    (2009.01)

(52) U.S. Cl.
  CPC .............. *H04W 4/021* (2013.01); *H04W 4/206* (2013.01); *G06Q 30/02* (2013.01); *G06Q 30/0241* (2013.01); *H04W 4/10* (2013.01)
  USPC ...................... 455/456.3; 455/456.1; 455/403; 455/404.2; 455/410; 455/414.3; 705/15.54; 705/14.49; 705/14.72; 705/14.12

(58) Field of Classification Search
  USPC ............. 455/456.1–456.3, 410, 414.3, 404.2, 455/403; 705/14.54, 14.49, 14.72, 14.12
  See application file for complete search history.

(56) References Cited

U.S. PATENT DOCUMENTS

| | | |
|---|---|---|
| 5,515,419 A | 5/1996 | Sheffer |
| 5,563,931 A | 10/1996 | Bishop et al. |
| 6,466,258 B1 | 10/2002 | Mogenis et al. |
| 6,784,833 B1 | 8/2004 | Evans |
| 6,807,564 B1 | 10/2004 | Zellner et al. |
| 6,816,090 B2 | 11/2004 | Teckchandani et al. |
| 7,149,774 B2 | 12/2006 | Zellner et al. |
| 7,221,928 B2 | 5/2007 | Laird et al. |
| 7,274,924 B2 | 9/2007 | Yoshioka |
| 7,312,709 B2 | 12/2007 | Kingston |
| 7,327,229 B1 | 2/2008 | Nichols et al. |
| 7,518,500 B2 | 4/2009 | Aninye et al. |

(Continued)

OTHER PUBLICATIONS

Alarm.com Overview—Android App., "Introducing the Alarm.com Android App", http://www.alarm.com/overview/overview_android.aspx, Jan. 26, 2011, 2 pages.

(Continued)

*Primary Examiner* — Michael T Vu
(74) *Attorney, Agent, or Firm* — Baker & Hostetler LLP

(57) ABSTRACT

An event based service provides services and/or products based on an event. Services/products are made available to persons attending an event. Services, products, and/or advertisements can be made available to persons via wireless mobile communications devices. The services/products can be made available to persons attending an event. Services/products can be made available while the event is occurring. Additionally, advertising space is auctioned allowing the ability to bid for advertising space for advertising services/products via the event based service. Individual providers can offer services/products to a group of people at the same location, and at a time that people may be most interested in the services/products. Access to the event based service can be via service provider offered access points. An individual provider's device can act as a server that enables services/products to be purchased. An individual provider's device can act as a network gateway that enables services/products to be purchased.

14 Claims, 7 Drawing Sheets

(56) References Cited

U.S. PATENT DOCUMENTS

| | | | |
|---|---|---|---|
| 2008/0064413 A1 | 3/2008 | Breed | |
| 2009/0085760 A1 | 4/2009 | Lee | |
| 2010/0023398 A1* | 1/2010 | Brown et al. | 705/14.49 |
| 2011/0173071 A1* | 7/2011 | Meyer et al. | 705/14.54 |

OTHER PUBLICATIONS

App Guide, "Motion Sensor Detection Alarm with Spy Audio RecorderCurrent Version: 1.2 (iOS 4.0 Tested)", MacWorld Insider, http://www.macworld.com/appguide/app.html?id=374758&expand=false, Jan. 26, 2011.

Author Unknown, "Eye See U—Video Surveillance", http://eyeseeu.ecaste.corn, Jan. 26, 2011, 2 pages.

Buchanan, "Night Recorder App Review", http://www.iphonefreak.com/2010/01/night-recorder-app-revoew.html, Jan. 27, 2010, 12 pages.

Flag Solutions, "Thief Buster Antitheft Alarm", iTunes App Store, http://itunes.apple.com/us/app/thief-buster-antitheft-alarm/id327463179?mt=8, Feb. 11, 2010, 2 pages.

Fun at Work, "Silent Bodyguard—Your Personal Panic Button", http://itunes.apple.com/us/app/silent-bodyguard-your-personal/id347506878?mt=8, May 10, 2010 , 2 pages.

Greenberg, "Android App Aims to Allow Wiretap-Proof Cell Phone Calls", Forbes, http://blogs.forbes.com/firewall/2010/05/25android-app-aims-to-allow-wiretap-proof-cell-phone-calls, May 25, 2010, 3 pages.

GSM Secure, "Silent Panic Buttons—Panic Alarm Systems", http://www.gsm-secure.co.uk/GSM-Panic-Alarrm.php, Jan. 26, 2011, 4 pages.

LoLer Apps, "Anti Theft Alarm: Step Away from the Phone!", www.alarm.com__itunes.apple.com__Anti-Theft-Alarm-stepaway/id368831595?mt=8, Jan. 26, 2011, 2 pages.

Martinelli, "iPhone App Arms Users with Silent Panic Button", Cult of Mac, http://www.cultofmac.com/iphone-app-arms-users-with-silent-panic-button/33862, Mar. 26, 2010, 11 pages.

Zagg Skins, "Undercover Discovers Your Lost or Stolen iPhone", AppCraver iPhone news and Reviews, http://www/appcraver.com/undercover, Jan. 26, 2011, 3 pages.

Martinelli, "iPhone App Arms Users with Silent Panic Button", http://www.cultofmac.com/iphone-app-arms-users-with-silent-panic-button/33862, Mar. 16, 2010, 10 pages.

Macedo "Caught Web-Handed: Social Media become Valuable Tool in Crime-Fighting", http://www.foxnews.com/scitech/2010/03/18/caught-web-handed-social-media-valuable-tool-crime-fighting/, Mar. 18, 2010, 3 pages.

Winder, "IBM: An Unlikely Crime-Fighting Superhero", http://www.daniweb.com/news/story276878.html, Apr. 8, 2010, 3 pages.

* cited by examiner

EVENT BASED SERVICE

TECHNICAL FIELD

The technical field generally relates to cloud services, and more specifically relates to event based personalized portable services.

BACKGROUND

When a developer, small business, or medium business owner wants to sell a product or service, typically, the owner places an ad in a newspaper, on television, on the radio, on eBay, or on Craig's List, for example. This type of advertising, tends to be broad in nature and provides advertisements to those who are not interested in the advertised product or service. Also, this type of advertising misses some of those who are interested in the product or service. Further, this type of advertising typically is not provided when the product of service is most needed or wanted by potential consumers.

SUMMARY

An event based service provides services and/or products based on an event. In an example embodiment, services and/or products are made available to persons attending an event, such as tradeshows, concerts, parades, festivals, sport events, transportation events (e.g., airport departures, airport arrivals, train station departures, train station arrivals), or the like. The event based service provides for services and/or products (services/products) to be advertised and made available to persons via wireless mobile communications devices. In an example embodiment, the services/products are made available to persons attending an event. In an example embodiment, services/products are made available while the event is occurring. Additionally, in another example embodiment, advertising space is auctioned allowing the ability to bid for advertising space for advertising services/products via the event based service. Accordingly, individual providers can offer services/products to a group of people at the same location, and at a time that people may be most interested in the services/products. Access to the event based service can be via service provider offered access points. In an example embodiment, an individual provider's device can act as a server that enables services/products to be purchased. In another example embodiment, an individual provider's device can act as a network gateway that enables services/products to be purchased.

DETAILED DESCRIPTION OF ILLUSTRATIVE EMBODIMENTS

Figure 1:
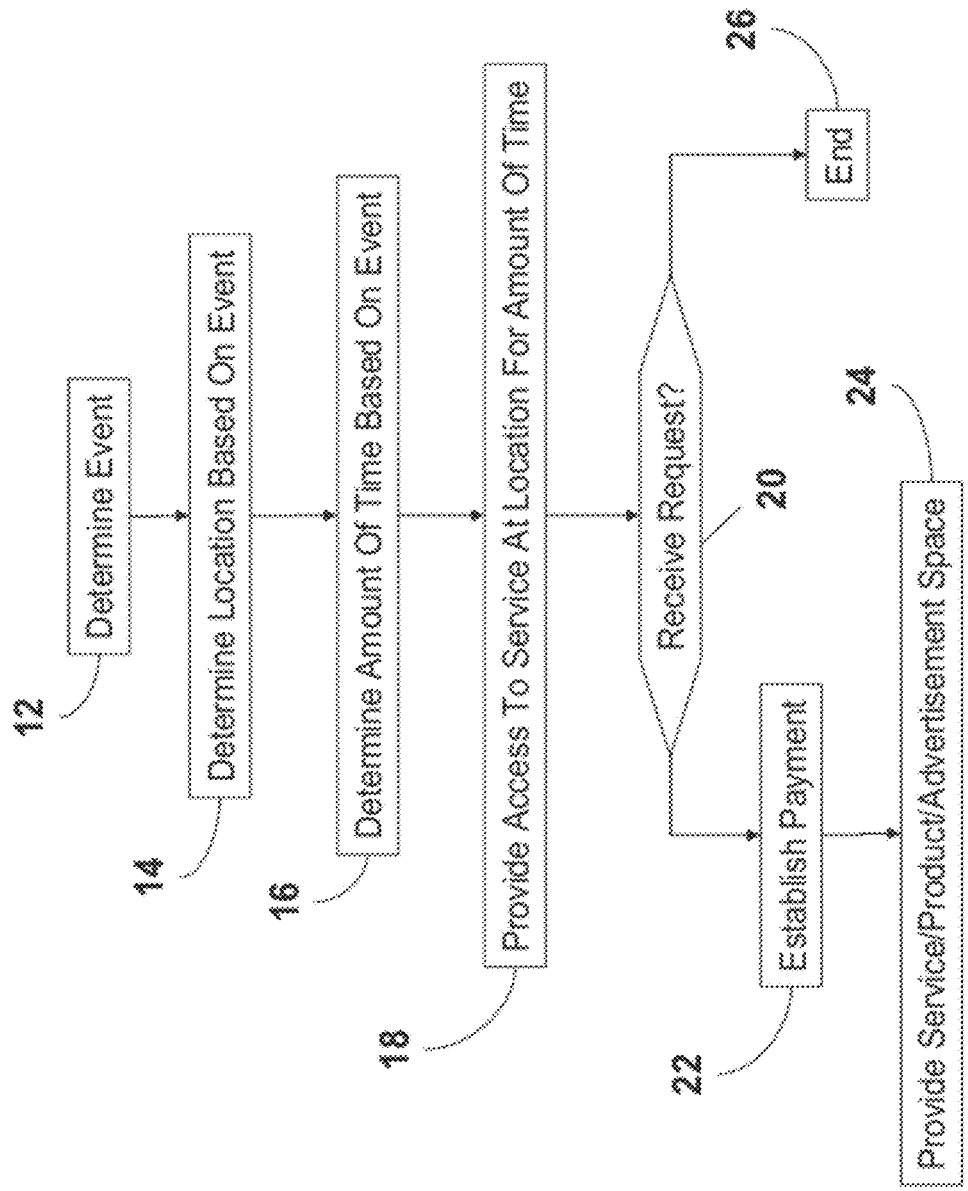
FIG. 1 is a flow diagram of an example process for implementing an event based service.

An event based service provides the ability for persons to offer products and/or services through an instant and dynamic advertisement channel to persons located at a common location. In an example embodiment, an event based service application is offered to telecommunications subscribers by the subscriber's telecommunications service provider. The event based service application can be downloaded to a mobile communications device and/or accessed via a network. The event based service application enables persons to bid on advertising space, and to purchase products and/or services, at the location of an event. In an example embodiment, users of the event based service application are able to access an advertisement bulletin board at the location of the event, thus allowing the users to observe available products and services. In an example embodiment, advertisements, services, and products are available for a limited period of time (e.g., the duration of the event). A product or service provider who places an advertisement via the event based service, may elect to leave the advertisement posted on the event based service for a period of time after he/she departs the event location. In another example embodiment, a product or service provider who places an advertisement via the event based service, may elect to leave the advertisement posted on the event based service for a period of time that extends beyond the duration of the event.

An event based service model allows a service and/or product provider to offer products and services via advertisement in a targeted location and time based on an event. The target customers can be physically located at (attending) the event. In an example embodiment, the target customers can be remotely located, observing the event. The event based service can be implemented at specific population condensed locations such as airports, train stations, stadiums, or marketplaces, as well as special events like tradeshows, concerts, parades, festivals, and sport events, etc. A service provider can work with location and event owners and/or managers to add mobile capabilities in order to provide the event based service to potential customers via their respective mobile wireless communications devices. For example, technologies such as 3G/4G, WiFi, and/or Femtocells can be made operational at an event location in order to enhance the network capacity.

In an example embodiment, the event base service includes a location and event based personal auction service for persons located at the event or remotely located. The personal auction service provides the ability for persons to bid for advertisement space on the event based service, for persons to bid for products and/or services via the event based service, for persons to purchase products and/or services via the event based service, and for persons to offer services and/or products via the event based service.

In an example configuration, an event base service application can be downloaded to a mobile communications device. And, once downloaded, the bidding and/or purchasing can be accomplished via the event based service application. Accordingly, any person at an event can download the event based service application on a respective mobile wireless communications device and utilize the event based service. In another example embodiment, the event based service application is accessible via a network (e.g., Internet, local network, etc.) via a browser or the like. When the event based service application is installed on a mobile wireless device and/or accessed via a network, notifications about available space for advertisement and/or available products and services offered by individual advertisers can be provided to the mobile communications device. Thus, the user of the mobile communications device will be aware of available product and/or services, and/or available advertising space.

In accordance with the event based service, a list of available locations and facilities (including current and upcoming) at which the event based service is/will be implemented, can be provided.

In order to make persons at an event that do not possess a mobile communications device aware of the products and/or services available via the event based service, localized advertisements could be displayed on a display at the event. For example, advertisements could be displayed on a large screen monitor at an event.

When a product and/or service is consumed, billing and charging can be accomplished via any appropriate provider, such as, for example, EWALLET. For example, a buyer can pay for service in an accrued account, and the money will go to the seller account only if the buyer is satisfied with the products or services consumed. In an example embodiment, the service provider and location owner can receive a percentage of the purchase price as a service fee (e.g., 5-10%). The seller can negotiate how much to pay for the advertisement. For example, payment could be a one time, location specific, payment or a package deal that allows the seller to issue on-the-run advertisements in multiple locations.

Various types of products and/or services can be offered via the event base service. For example, commercial network games and/or self-developed network games can be offered. Games could be offered with a time of use based charge (e.g., $2 per 30 minutes). WIFI and/or tethering access services could be offered via the event based service. A WIFI and/or tethering access service can offer, for example, use of an individual's device (e.g., mobile communications device) as a gateway by other devices to access a network, such as the Internet, for example. A charge for a WIFI and/or tethering access service could be a time of use based charge (e.g., $2 per 15 minutes). The event based service could be utilized for advertisement message testing. Similar to a survey, advertisement message testing allows an individual to post an advertisement, such as a new luggage design for example, to attract others to vote for the design or offer an online web site for interested parties to browse when they get a change at a later time. The event based service can be used to provide a special topic advice service. For example, a travel specialist could offer consultation services for travelers who are contemplating staying at a local resort and are looking advice about the local resort. The event based service could be used to provide special note sharing. For example, a frequent traveler may have just finished a 10 day trip in Hawaii and is ready to flight back to California. The frequent traveler could write a trip note detailing his opinion about how to spend 7 days in Hawaii in July. When he is in the airport, he can use the bulletin board of the event based service to attract interested parties to pay to review his trip notes. The event based service can be used to advertise that an apartment is for rent, that an individual has goods to barter, and/or local restaurants, for example. Stores in or near the location of an event can advertise their products and services via the event based service.

In an example scenario utilizing the event based service, a spectator at a baseball game watches batter break a home run record. The spectator wants to purchase a jersey bearing the batter's name and number. The spectator, having the event based service application already downloaded on his mobile communications device, orders the jersey before the price goes up and before supplies are depleted.

In another example scenario utilizing the event based service, a vendor at a football game sells hot drinks As the temperature at the game become very cold, the vendor bids for advertising space on the event based service to advertise that hot chocolate is available at the vendor's booth. This allows the vendor flexibility as to when and where the vendor would like to advertise. Because the potential consumers come and go and the bidder (vendor in this example) also comes and goes, this personal auction service offers dynamic adverting service capabilities.

In another example scenario utilizing the event based service, a family of four is in an airport awaiting departure of their flight, which is scheduled to board in about an hour or more. The parents of the family are reading magazines to pass the time. However, their children are bored. The parents, having the event based service application already downloaded on a mobile communications device, see, via the event based service, that another individual is offering a popular network game for $1. The parents decides to pay for the network game, and provide the mobile communications device to their children. And, the children, using the mobile communications device, play the game for 1 hour prior to boarding.

In another example scenario utilizing the event based service, a first traveler at an airport has a mobile communications device capable of being used as a gateway to the Internet. The traveler is on his way to Hawaii and has a lay over in San Francisco airport for about three hours. The traveler decides to earn some money while he is waiting in the San Francisco airport, and, via the event based service application on his mobile communications device, advertises gateway access to the Internet via his mobile communications device. Around the same time, a second traveler is trying to access his email service but can not because there is no WiFi access where the second traveler is located. The second traveler invokes his event based service application on his mobile communications device and sees the gateway being offered by the first traveler. The second traveler decides to use gateway to access his email account. The second traveler's event based service application sends a connection request to the first travel's mobile communications device which requests a connection to internet.

In another example scenario utilizing the event based service, a first traveler is an expert in playing and developing computer games. When he is making a flight connection in San Jose airport, he realizes that the connecting flight will be 3 hours late due to stormy weather in Chicago. Many other flights are also delayed. And, he notices that a lot of children are running around making much noise. The traveler decides to offer his game services to folks in the airport. He invokes the event based service application, which posts an advertisement on a virtual bulletin board with time per use charge (e.g., $1 per 30 minutes). Parents, wanting to calm down their children, invoke their event based service applications and browse through available products and services in/near their location. Parents see the popular game advertised on event based service bulletin board, and order the game.

FIG. 1 is a flow diagram of an example process for implementing an event based service. An event is determined at step 12. An event can comprise any appropriate as described herein. For example, and event can comprise a tradeshow, a concert, a parade, a festival, a sports event, a transportation event (e.g., airport departure, airport arrival, train station departure, train station arrival, vehicle departure, vehicle arrival, etc.), a flea market, or the like. At step 14, the location to provide the event based service is determined. The location can be the geographic location of the event, a region proximate to the event (e.g.. sports stadium and parking area, airport and parking area, town in which a parade is held, field where a flea market is being conducted, etc.). The amount of time to provide the event based service is determined at step 16. The start time and end time during which to provide the event based service can be determined ate step 16. Any appropriate amount of time can be determined. In an example embodiment, the amount of time can be the duration of the event (e.g., the time starting when the event starts to the time when the event ends). In another example embodiment, the amount of time can be the duration of the event plus some time before the event starts and some time after the event ends. In another example embodiment, the amount of time can be a predetermined amount of time that may or may not coincide with the event. For example, multiple events may be conducted at a location during a weekend. And, the amount of time could be the entire weekend (e.g., 48 hours).

The event based service, as described herein, is provided at the determined location for the determined amount of time at step 18. As described herein, the event based service can be provided via a mobile communications device, via a network, such as the Internet for example, of a combination thereof. In an example embodiment, an event based service application is installed on a mobile communication device, and the event base service is utilized via the application on the mobile communication device.

At step 20, it is determined if a request was received. The request can be any appropriate request received via the event based service. For example, the request can be, as described herein, a request for a produce, a request for a service, a request to advertise, or any combination thereof. If a request is received at step 20, payment is negotiated and established (as described herein) at step 22 and the requested service, product, advertisement space is provided at step 24. If a request is not received at step 20, the process end at step 26.

Figure 2:
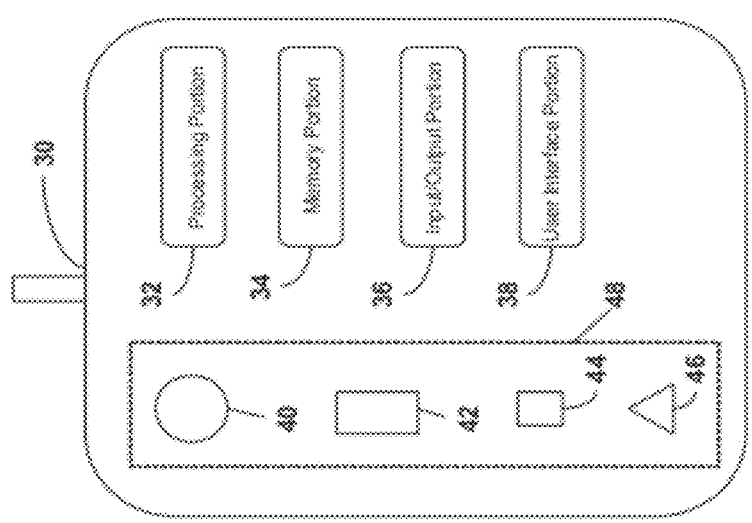
FIG. 2 is a block diagram of an example wireless communications device 30 that is configurable to be utilized with the event based service.

FIG. 2 is a block diagram of an example wireless communications device 30 that is configurable to be utilized with the event based service. In an example configuration, the wireless communications device 30 is a mobile wireless device. The communications device 30 can include any appropriate device, mechanism, software, and/or hardware for facilitating the event based service as described herein. As described herein, the communications device 30 comprises hardware or a combination of hardware and software. In an example configuration, the communications device 30 comprises a processing portion 32, a memory portion 34, an input/output portion 36, a user interface (UI) portion 38, and a sensor portion 48 comprising at least one of a video camera portion 40, a force/wave sensor 42, a microphone 44, a moisture sensor 46, or a combination thereof. The force/wave sensor comprises at least one of a motion detector, an accelerometer, an acoustic sensor, a tilt sensor, a pressure sensor, a temperature sensor, or the like. The motion detector is configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a loud noise, for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 46 is capable of detecting moisture, such as detecting if the communications device 30 is submerged in a liquid. The processing portion 32, memory portion 34, input/output portion 36, user interface (UI) portion 38, video camera portion 40, force/wave sensor 42, and microphone 44 are coupled together to allow communications therebetween (coupling not shown in FIG. 2). The communications device can comprise a timer (not depicted in FIG. 2).

In various embodiments, the input/output portion 36 comprises a receiver of the communications device 30, a transmitter of the communications device 30, or a combination thereof. The input/output portion 36 is capable of receiving and/or providing information pertaining to event based service via the communications device 30 as described herein. For example, the input/output portion 36 can include a wireless communications (e.g., 2.5G/3G/GPS) SIM card. The input/output portion 36 is capable of receiving and/or sending video information, audio information, control information, image information, data, or any combination thereof. In an example embodiment, the input/output portion 36 is capable of receiving and/or sending information to determine a location of the communications device 30. In an example configuration, the input\output portion 36 comprises a GPS receiver. In an example configuration, the communications device 30 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 36 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 32 is capable of facilitating event based service via the communications device 30 as described herein. For example, the processing portion 32 is capable of, in conjunction with any other portion of the communications device 30, installing an event based service application, processing an event based service application, configuring the communications device 30 to function as a gateway for other devices to a network, determining the location at which to provide the event based service, determining the duration during which to provide the event based service, determining a start time and an end time for providing the event based service, or the like, or any combination thereof. The processing portion 32, in conjunction with any other portion of the communications device 30, can provide the ability for users/subscribers to bid on a product, bid on a service, provide an offer for a product, provide an offer for a service, request advertising space, offer a product, offer a service, or the like, or any combination thereof, as described herein. The processing portion 32, in conjunction with any other portion of the communications device 30, enables the communications device 30 to covert speech to text when it is configured to also send text messages while utilizing the event based service.

In a basic configuration, the communications device 30 can include at least one memory portion 34. The memory portion 34 can store any information utilized in conjunction with the event based service as described herein. For example, the memory portion 34 is capable of storing information pertaining to location of a communications device 30, subscriber profile information, subscriber identification information, designated phone numbers to send video and audio information, an identification code (e.g., phone number) of the communications device, video information, audio information, control information, product information, service information, event information, advertisement information, event location information, event duration information, or a combination thereof. Depending upon the exact configuration and type of processor, the memory portion 34 can be volatile (such as some types of RAM), non-volatile (such as ROM, flash memory, etc.). The communications device 30 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like.

The communications device 30 also can contain a UI portion 38 allowing a user to communicate with the communications device 30. The UI portion 38 is capable of rendering any information utilized in conjunction the event based service as described herein. For example, the UI portion 38 can provide means for entering text, entering a phone number, entering a bid, entering an offer, rendering a bid, rendering an offer, rendering text, rendering images, rendering multimedia, rendering sound, rendering video, or the like, as described herein. The UI portion 38 can provide the ability to control the communications device 30, via, for example, buttons, soft keys, voice actuated controls, a touch screen, movement of the mobile communications device 30, visual cues (e.g., moving a hand in front of a camera on the mobile communications device 30), or the like. The UI portion 38 can provide visual information (e.g., via a display), audio information (e.g., via speaker), mechanically (e.g., via a vibrating mechanism), or a combination thereof. In various configurations, the UI portion 38 can comprise a display, a touch screen, a keyboard, a speaker, or any combination thereof. The UI portion 38 can comprise means for inputting biometric information, such as, for example, fingerprint information, retinal information, voice information, and/or facial characteristic information. The UI portion 38 can be utilized to enter an indication of the designated destination (e.g., the phone number, IP address, or the like).

In an example embodiment, the sensor portion 48 of the communications device 30 comprises the video camera portion 40, the force/wave sensor 42, and the microphone 44. The video camera portion 40 comprises a camera and associated equipment capable of capturing still images and/or video and to provide the captured still images and/or video to other portions of the communications device 30. In an example embodiment, the force/wave sensor 42 comprises an accelerometer, a tilt sensor, an acoustic sensor capable of sensing acoustic energy, an optical sensor (e.g., infrared), or any combination thereof In another example embodiment, the communications device comprises a key pad, a display (e.g., an LED display, or the like), a rechargeable battery pack, and a power indicator (e.g., light). The key pad can be an integral or attached part of the communications device or can be a remote key pad. Thus, a wireless key pad and a display can allow a user to key in outbound communication numbers, a secured pass-code, or the like. This pass-code allows the owner to disable the external operating/stand-by/off switch and to soft control the switch mode. When the communications device is switched/set to the stand-by mode, a delay can be initiated (e.g., 38 second delay) before the force/wave sensor starts to operate. When the communications device is equipped with a wireless key pad, the owner can set the mode remotely.

In yet another example embodiment, the communications device comprises a two way speaker phone and GPS integration with a video screen. The video screen can optionally comprise a touch screen. A wireless key pad and a GPS video screen can allow a user to key in an outbound communication number, a secured pass-code, or the like. This pass-code allows the user to disable the external operating/stand-by/off switch and to soft control the switch mode. The communications device can receive an SMS type message from a remote device (e.g., a wireless communications device, security social network server) which causes the communications device to allow control of functionality of the communications device. The remote device can send SMS-type messages to the communications device to control the camera (angle, focus, light sensitivity, zoom, etc.) and the volume of the speaker phone. The communications device in conjunction with the GPS video capability allows a two way video and audio communication. Utilizing the GPS functionality, the user can be provided, via his/her wireless communications device, location information. Thus, if a car has been stolen, the owner can receive an indication of the location of the car overlaid on a geographical map. When receiving a communication, if the owner is on another call, the call can be preempted, (but not disconnect). Further, a centralized secured database can be utilized to store the video/audio information received from the communications device and can be associated with the communications device identification code and a timestamp. The centralized store video/audio information can be retrieved by subscriber/owner, security service agent, or law enforcement staff on demand.

Figure 3:
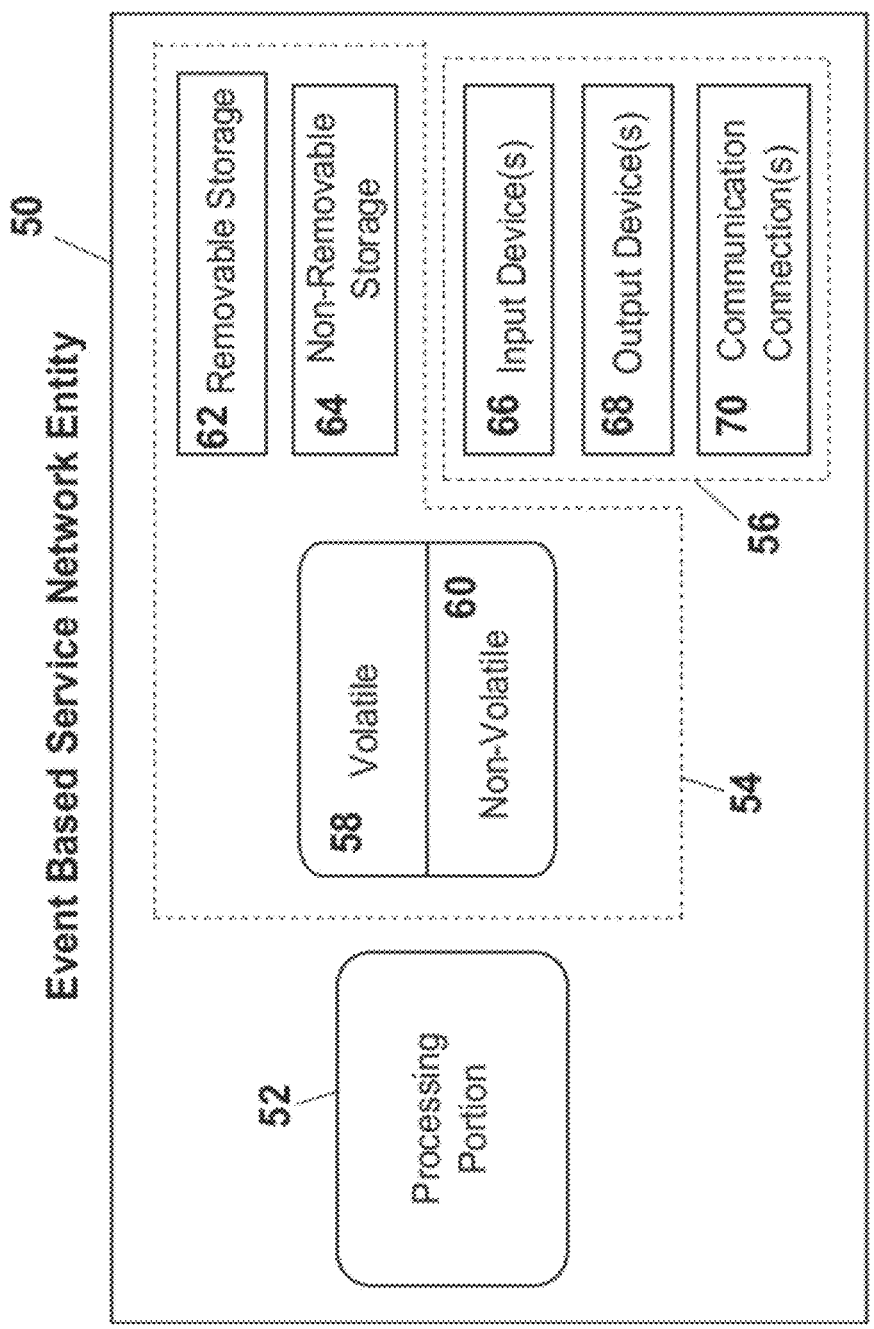
FIG. 3 is a block diagram of an example network entity 50 for implementing the event based service.

FIG. 3 is a block diagram of an example network entity 50 for implementing the event based service. The event based service entity 50 comprises hardware or a combination of hardware and software. When used in conjunction with a network, the functionality needed to implement an event based service can reside in any one or combination of network entities. The network entity 50 depicted in FIG. 3 represents any appropriate network entity, or combination of network entities, such as a processor, a server, a gateway, etc., or any combination thereof. In an example configuration, the network entity 50 comprises a component or various components of a cellular broadcast system wireless network. It is emphasized that the block diagram depicted in FIG. 3 is exemplary and not intended to imply a specific implementation or configuration. Thus, the network entity 50 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example configuration, the network entity 50 comprises a processing portion 52, a memory portion 54, and an input/output portion 56. The processing portion 52, memory portion 54, and input/output portion 56 are coupled together (coupling not shown in FIG. 3) to allow communications therebetween. The input/output portion 56 is capable of receiving and/or providing information from/to a device (e.g., device 30) and/or other network entities configured to be utilized with the event based service. For example, the input/output portion 56 can include a wireless communications (e.g., 2.5G/3G/GPS) card. The input/output portion 56 is capable of receiving and/or sending video information, audio information, control information, image information, data, or any combination thereof. In an example embodiment, the input/output portion 36 is capable of receiving and/or sending information to determine a location of the network entity 50 and/or the communications device 30. In an example configuration, the input\output portion 56 comprises a GPS receiver. In an example configuration, the network entity 50 can determine its own geographical location and/or the geographical location of a mobile communications device (e.g., communication device 30) through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 36 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like, or a combination thereof The processing portion 52 is capable of performing functions associated with the event based service, as described herein. That is, a communications device can perform functions internally (by the device) and/or utilize the network entity 50 to perform functions. For example, the processing portion 52 is capable of, in conjunction with any other portion of the network entity 50, installing an event based service application, processing an event based service application, configuring the network entity 50 to function as a gateway for other devices to a network, determining the location at which to provide the event based service, determining the duration during which to provide the event based service, determining a start time and an end time for providing the event based service, or the like, or any combination thereof. The processing portion 52, in conjunction with any other portion of the network entity 50, can provide the ability for users/subscribers to bid on a product, bid on a service, provide an offer for a product, provide an offer for a service, request advertising space, offer a product, offer a service, or the like, or any combination thereof, as described herein. The processing portion 52, in conjunction with any other portion of the network entity 50, enables the network entity 50 to covert speech to text when it is configured to also send text messages while utilizing the event based service.

The memory portion 54 can store any information utilized in conjunction with the event based service. Thus, a communications device can utilize its internal memory/storage capabilities and/or utilize memory/storage capabilities of the network entity 50. For example, the memory portion 54 is capable of storing information related to location of a communications device 30, location of a network entity 50, subscriber profile information, subscriber identification information, designated phone numbers to send video and audio information, an identification code (e.g., phone number) of the communications device, video information, audio information, control information, product information, service information, event information, advertisement information, event location information, event duration information, or a combination thereof. Depending upon the exact configuration and type of network entity, the memory portion 54 can include computer readable storage media that is volatile 58 (such as dynamic RAM), non-volatile 60 (such as ROM), or a combination thereof. The network entity 50 can include additional storage, in the form of computer readable storage media (e.g., removable storage 62 and/or non-removable storage 64) including, but not limited to, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the network entity 50. As described herein, a computer-readable storage medium is an article of manufacture.

The network entity 50 also can contain communications connection(s) 70 that allow the network entity 50 to communicate with other devices, network entities, or the like. A communications connection(s) can comprise communication media. Communication media typically embody computer readable instructions, data structures, program modules or other data in a modulated data signal such as a carrier wave or other transport mechanism and includes any information delivery media. By way of example, and not limitation, communication media include wired media such as a wired network or direct-wired connection, and wireless media such as acoustic, RF, infrared, and other wireless media. The term computer readable media as used herein includes both storage media and communication media. The network entity 50 also can include input device(s) 66 such as keyboard, mouse, pen, voice input device, touch input device, etc. Output device(s) 68 such as a display, speakers, printer, etc. also can be included.

The communications device (e.g., communications device 12 can be part of and/or in communication with various wireless communications networks. Some of which are described below.

Figure 4:
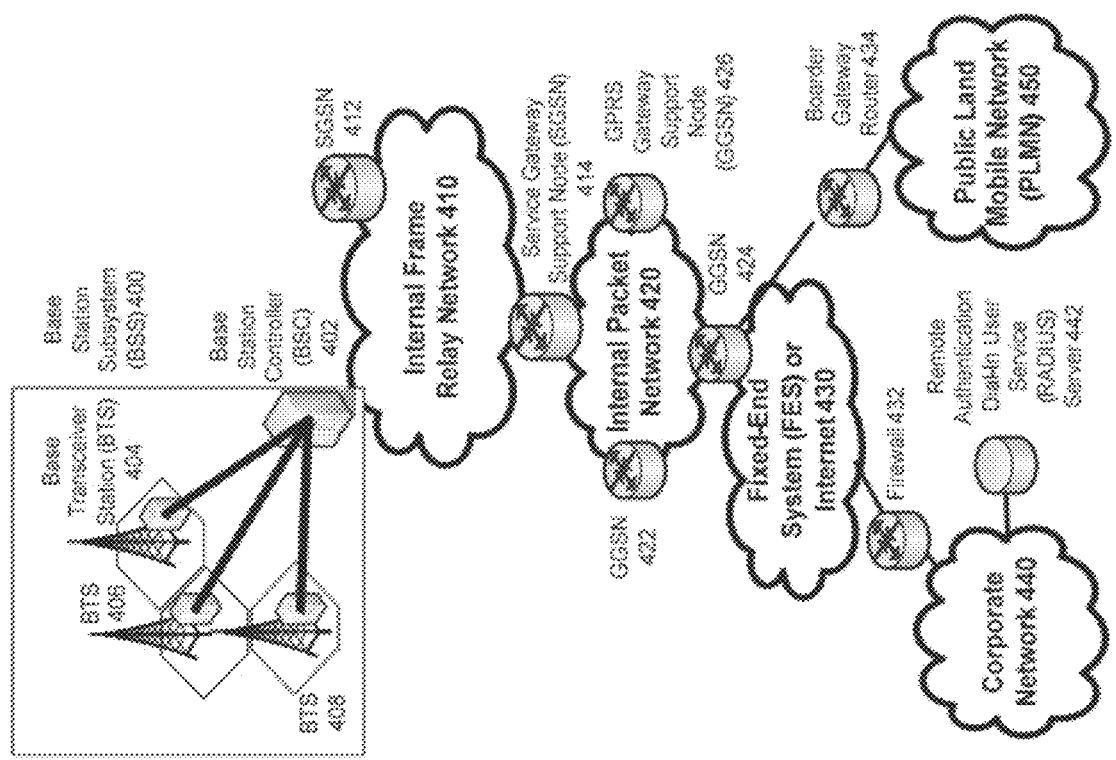
FIG. 4 depicts an overall block diagram of an exemplary packet-based mobile cellular network environment, such as a GPRS network, in which an event based service can be implemented.

FIG. 4 depicts an overall block diagram of an exemplary packet-based mobile cellular network environment, such as a GPRS network, in which an event based service can be implemented. In the exemplary packet-based mobile cellular network environment shown in FIG. 4, there are a plurality of Base Station Subsystems ("BSS") 400 (only one is shown), each of which comprises a Base Station Controller ("BSC") 402 serving a plurality of Base Transceiver Stations ("BTS") such as BTSs 404, 406, and 408. BTSs 404, 406, 408, etc. are the access points where users of packet-based mobile devices become connected to the wireless network. In exemplary fashion, the packet traffic originating from user devices is transported via an over-the-air interface to a BTS 408, and from the BTS 408 to the BSC 402. Base station subsystems, such as BSS 400, are a part of internal frame relay network 410 that can include Service GPRS Support Nodes ("SGSN") such as SGSN 412 and 414. Each SGSN is connected to an internal packet network 420 through which a SGSN 412, 414, etc. can route data packets to and from a plurality of gateway GPRS support nodes (GGSN) 422, 424, 426, etc. As illustrated, SGSN 414 and GGSNs 422, 424, and 426 are part of internal packet network 420. Gateway GPRS serving nodes 422, 424 and 426 mainly provide an interface to external Internet Protocol ("IP") networks such as Public Land Mobile Network ("PLMN") 450, corporate intranets 440, or Fixed-End System ("FES") or the public Internet 430. As illustrated, subscriber corporate network 440 may be connected to GGSN 424 via firewall 432; and PLMN 450 is connected to GGSN 424 via boarder gateway router 434. The Remote Authentication Dial-In User Service ("RADIUS") server 442 may be used for caller authentication when a user of a mobile cellular device calls corporate network 440.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 5:
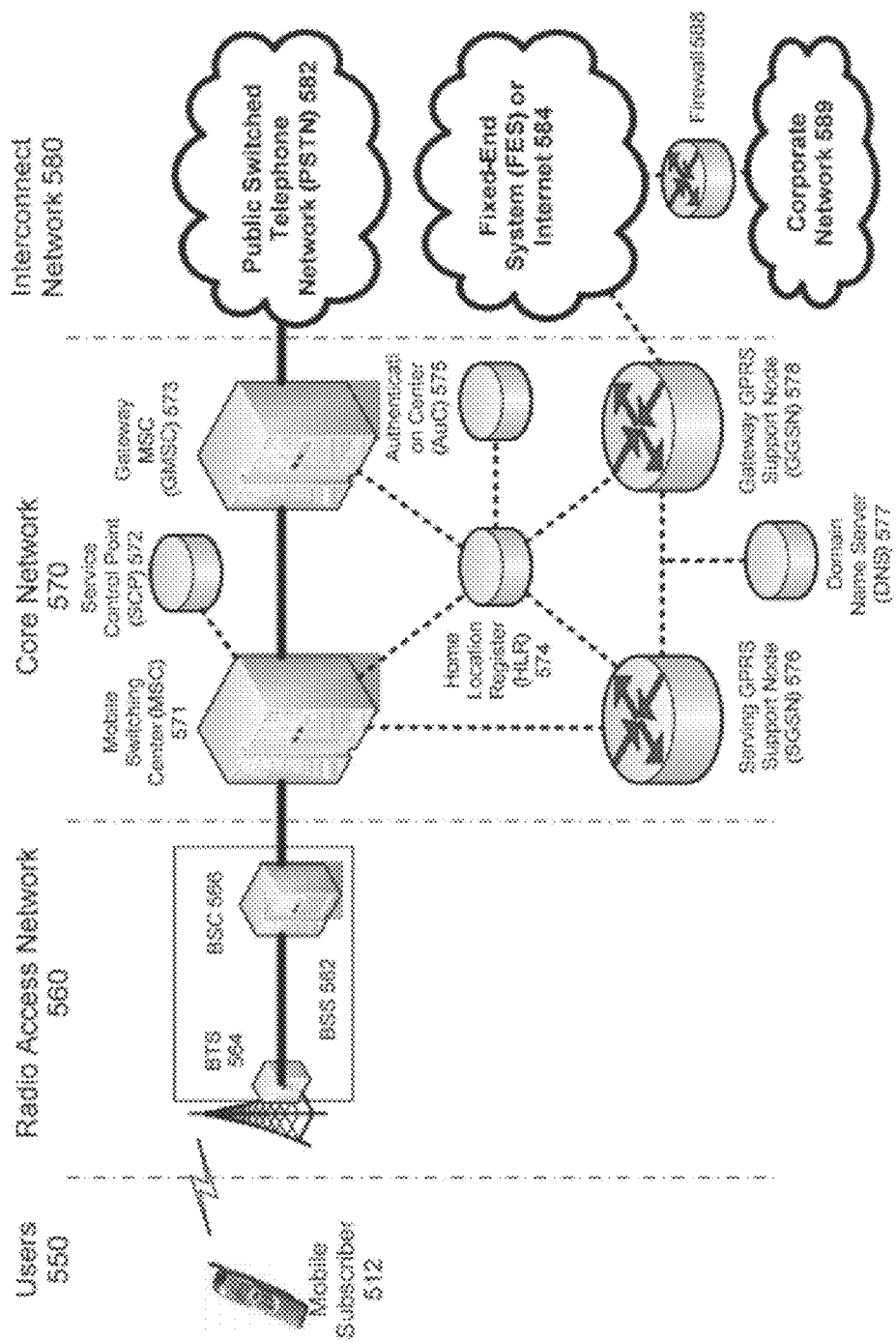
FIG. 5 illustrates an architecture of a typical GPRS network in which an event based service can be implemented.

FIG. 5 illustrates an architecture of a typical GPRS network in which an event based service can be implemented. The architecture depicted in FIG. 5 is segmented into four groups: users 550, radio access network 560, core network 570, and interconnect network 580. Users 550 comprise a plurality of end users. Note, device 512 is referred to as a mobile subscriber in the description of network shown in FIG. 5. In an example embodiment, the device depicted as mobile subscriber 512 comprises a communications device (e.g., wireless anti-theft security communications device 12). Radio access network 560 comprises a plurality of base station subsystems such as BSSs 562, which include BTSs 564 and BSCs 566. Core network 570 comprises a host of various network elements. As illustrated in FIG. 5, core network 570 may comprise Mobile Switching Center ("MSC") 571, Service Control Point ("SCP") 572, gateway MSC 573, SGSN 576, Home Location Register ("HLR") 574, Authentication Center ("AuC") 575, Domain Name Server ("DNS") 577, and GGSN 578. Interconnect network 580 also comprises a host of various networks and other network elements. As illustrated in FIG. 5, interconnect network 580 comprises Public Switched Telephone Network ("PSTN") 582, Fixed-End System ("FES") or Internet 584, firewall 588, and Corporate Network 589.

A mobile switching center can be connected to a large number of base station controllers. At MSC 571, for instance, depending on the type of traffic, the traffic may be separated in that voice may be sent to Public Switched Telephone Network ("PSTN") 582 through Gateway MSC ("GMSC") 573, and/or data may be sent to SGSN 576, which then sends the data traffic to GGSN 578 for further forwarding.

When MSC 571 receives call traffic, for example, from BSC 566, it sends a query to a database hosted by SCP 572. The SCP 572 processes the request and issues a response to MSC 571 so that it may continue call processing as appropriate.

The HLR 574 is a centralized database for users to register to the GPRS network. HLR 574 stores static information about the subscribers such as the International Mobile Subscriber Identity ("IMSI"), subscribed services, and a key for authenticating the subscriber. HLR 574 also stores dynamic subscriber information such as the current location of the mobile subscriber. Associated with HLR 574 is AuC 575. AuC 575 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 5, when mobile subscriber 512 initiates the attach process by turning on the network capabilities of the mobile device, an attach request is sent by mobile subscriber 512 to SGSN 576. The SGSN 576 queries another SGSN, to which mobile subscriber 512 was attached before, for the identity of mobile subscriber 512. Upon receiving the identity of mobile subscriber 512 from the other SGSN, SGSN 576 requests more information from mobile subscriber 512. This information is used to authenticate mobile subscriber 512 to SGSN 576 by HLR 574. Once verified, SGSN 576 sends a location update to HLR 574 indicating the change of location to a new SGSN, in this case SGSN 576. HLR 574 notifies the old SGSN, to which mobile subscriber 512 was attached before, to cancel the location process for mobile subscriber 512. HLR 574 then notifies SGSN 576 that the location update has been performed. At this time, SGSN 576 sends an Attach Accept message to mobile subscriber 512, which in turn sends an Attach Complete message to SGSN 576.

After attaching itself with the network, mobile subscriber 512 then goes through the authentication process. In the authentication process, SGSN 576 sends the authentication information to HLR 574, which sends information back to SGSN 576 based on the user profile that was part of the user's initial setup. The SGSN 576 then sends a request for authentication and ciphering to mobile subscriber 512. The mobile subscriber 512 uses an algorithm to send the user identification (ID) and password to SGSN 576. The SGSN 576 uses the same algorithm and compares the result. If a match occurs, SGSN 576 authenticates mobile subscriber 512.

Next, the mobile subscriber 512 establishes a user session with the destination network, corporate network 589, by going through a Packet Data Protocol ("PDP") activation process. Briefly, in the process, mobile subscriber 512 requests access to the Access Point Name ("APN"), for example, UPS.com, and SGSN 576 receives the activation request from mobile subscriber 512. SGSN 576 then initiates a Domain Name Service ("DNS") query to learn which GGSN node has access to the UPS.com APN. The DNS query is sent to the DNS server within the core network 570, such as DNS 577, which is provisioned to map to one or more GGSN nodes in the core network 570. Based on the APN, the mapped GGSN 578 can access the requested corporate network 589. The SGSN 576 then sends to GGSN 578 a Create Packet Data Protocol ("PDP") Context Request message that contains necessary information. The GGSN 578 sends a Create PDP Context Response message to SGSN 576, which then sends an Activate PDP Context Accept message to mobile subscriber 512.

Once activated, data packets of the call made by mobile subscriber 512 can then go through radio access network 560, core network 570, and interconnect network 580, in a particular fixed-end system or Internet 584 and firewall 588, to reach corporate network 589.

Figure 6:
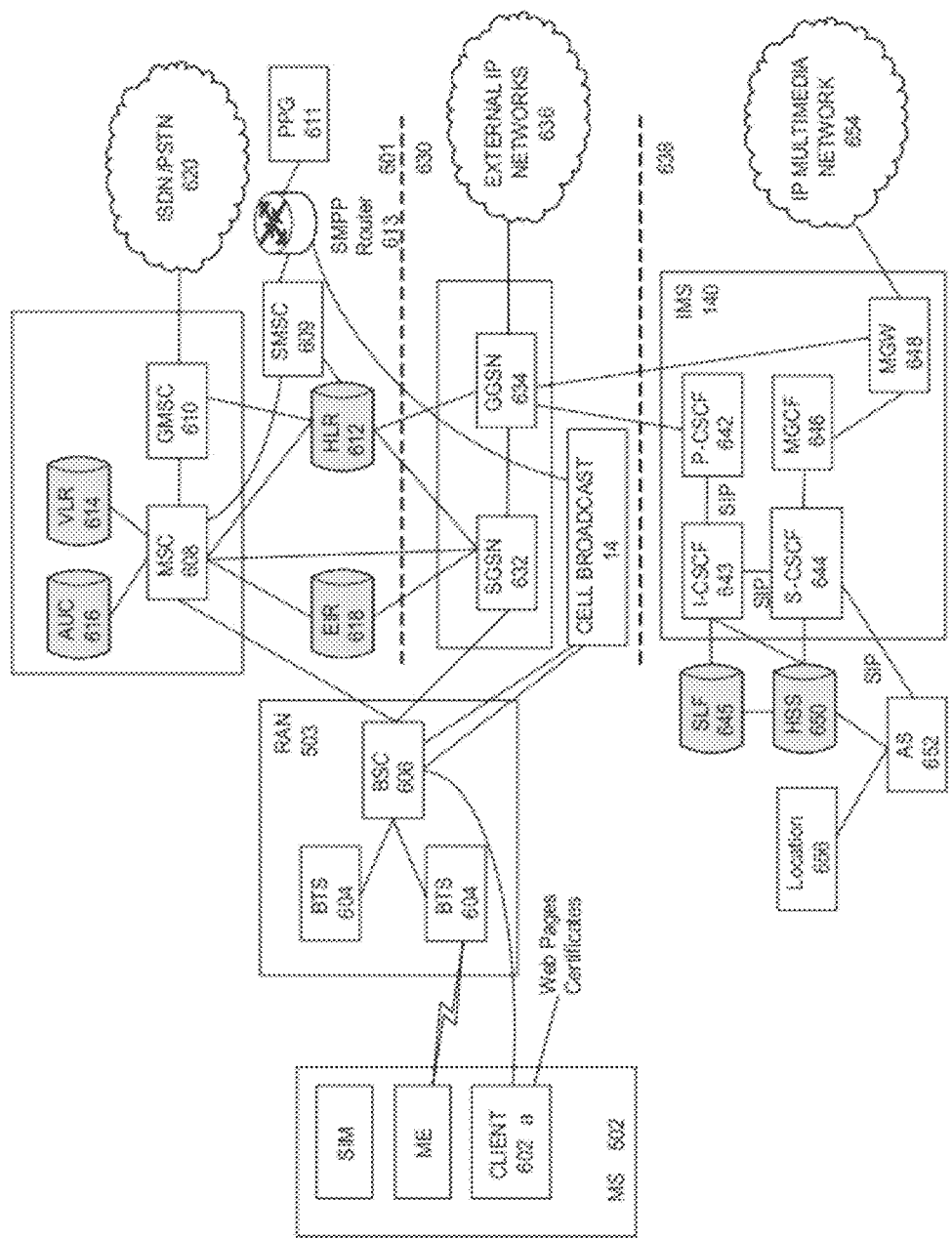
FIG. 6 illustrates an exemplary block diagram view of a GSM/GPRS/IP multimedia network architecture within which an event based service can be implemented.

FIG. 6 illustrates an exemplary block diagram view of a GSM/GPRS/IP multimedia network architecture within which an event based service can be implemented. As illustrated, the architecture of FIG. 6 includes a GSM core network 601, a GPRS network 630 and an IP multimedia network 638. The GSM core network 601 includes a Mobile Station (MS) 602, at least one Base Transceiver Station (BTS) 604 and a Base Station Controller (BSC) 606. The MS 602 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 604 is physical equipment, such as a radio tower, that enables a radio interface to communicate with the MS. Each BTS may serve more than one MS. The BSC 606 manages radio resources, including the BTS. The BSC may be connected to several BTSs. The BSC and BTS components, in combination, are generally referred to as a base station (BSS) or radio access network (RAN) 603.

The GSM core network 601 also includes a Mobile Switching Center (MSC) 608, a Gateway Mobile Switching Center (GMSC) 610, a Home Location Register (HLR) 612, Visitor Location Register (VLR) 614, an Authentication Center (AuC) 618, and an Equipment Identity Register (EIR) 616. The MSC 608 performs a switching function for the network. The MSC also performs other functions, such as registration, authentication, location updating, handovers, and call routing. The GMSC 610 provides a gateway between the GSM network and other networks, such as an Integrated Services Digital Network (ISDN) or Public Switched Telephone Networks (PSTNs) 620. Thus, the GMSC 610 provides interworking functionality with external networks.

The HLR 612 is a database that contains administrative information regarding each subscriber registered in a corresponding GSM network. The HLR 612 also contains the current location of each MS. The VLR 614 is a database that contains selected administrative information from the HLR 612. The VLR contains information necessary for call control and provision of subscribed services for each MS currently located in a geographical area controlled by the VLR. The HLR 612 and the VLR 614, together with the MSC 608, provide the call routing and roaming capabilities of GSM. The AuC 616 provides the parameters needed for authentication and encryption functions. Such parameters allow verification of a subscriber's identity. The EIR 618 stores security-sensitive information about the mobile equipment.

A Short Message Service Center (SMSC) 609 allows one-to-one Short Message Service (SMS) messages to be sent to/from the MS 602. A Push Proxy Gateway (PPG) 611 is used to "push" (i.e., send without a synchronous request) content to the MS 602. The PPG 611 acts as a proxy between wired and wireless networks to facilitate pushing of data to the MS 602. A Short Message Peer to Peer (SMPP) protocol router 613 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 602 sends a location update including its current location information to the MSC/VLR, via the BTS 604 and the BSC 606. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 630 is logically implemented on the GSM core network architecture by introducing two packet-switching network nodes, a serving GPRS support node (SGSN) 632, a cell broadcast and a Gateway GPRS support node (GGSN) 634. The SGSN 632 is at the same hierarchical level as the MSC 608 in the GSM network. The SGSN controls the connection between the GPRS network and the MS 602. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 634 provides a gateway between the GPRS network and a public packet network (PDN) or other IP networks 636. That is, the GGSN provides interworking functionality with external networks, and sets up a logical link to the MS through the SGSN. When packet-switched data leaves the GPRS network, it is transferred to an external TCP-IP network 636, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 630 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 638 was introduced with 3GPP Release 6, and includes an IP multimedia subsystem (IMS) 640 to provide rich multimedia services to end users. A representative set of the network entities within the IMS 640 are a call/session control function (CSCF), a media gateway control function (MGCF) 646, a media gateway (MGW) 648, and a master subscriber database, called a home subscriber server (HSS) 650. The HSS 650 may be common to the GSM network 601, the GPRS network 630 as well as the IP multimedia network 638.

The IP multimedia system 640 is built around the call/session control function, of which there are three types: an interrogating CSCF (I-CSCF) 643, a proxy CSCF (P-CSCF) 642, and a serving CSCF (S-CSCF) 644. The P-CSCF 642 is the MS's first point of contact with the IMS 640. The P-CSCF 642 forwards session initiation protocol (SIP) messages received from the MS to an SIP server in a home network (and vice versa) of the MS. The P-CSCF 642 may also modify an outgoing request according to a set of rules defined by the network operator (for example, address analysis and potential modification).

The I-CSCF 643, forms an entrance to a home network and hides the inner topology of the home network from other networks and provides flexibility for selecting an S-CSCF. The I-CSCF 643 may contact a subscriber location function (SLF) 645 to determine which HSS 650 to use for the particular subscriber, if multiple HSS's 650 are present. The S-CSCF 644 performs the session control services for the MS 602. This includes routing originating sessions to external networks and routing terminating sessions to visited networks. The S-CSCF 644 also decides whether an application server (AS) 652 is required to receive information on an incoming SIP session request to ensure appropriate service handling. This decision is based on information received from the HSS 650 (or other sources, such as an application server 652). The AS 652 also communicates to a location server 656 (e.g., a Gateway Mobile Location Center (GMLC)) that provides a position (e.g., latitude/longitude coordinates) of the MS 602.

The HSS 650 contains a subscriber profile and keeps track of which core network node is currently handling the subscriber. It also supports subscriber authentication and authorization functions (AAA). In networks with more than one HSS 650, a subscriber location function provides information on the HSS 650 that contains the profile of a given subscriber.

The MGCF 646 provides interworking functionality between SIP session control signaling from the IMS 640 and ISUP/BICC call control signaling from the external GSTN networks (not shown). It also controls the media gateway (MGW) 648 that provides user-plane interworking functionality (e.g., converting between AMR- and PCM-coded voice). The MGW 648 also communicates with other IP multimedia networks 654.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 7:
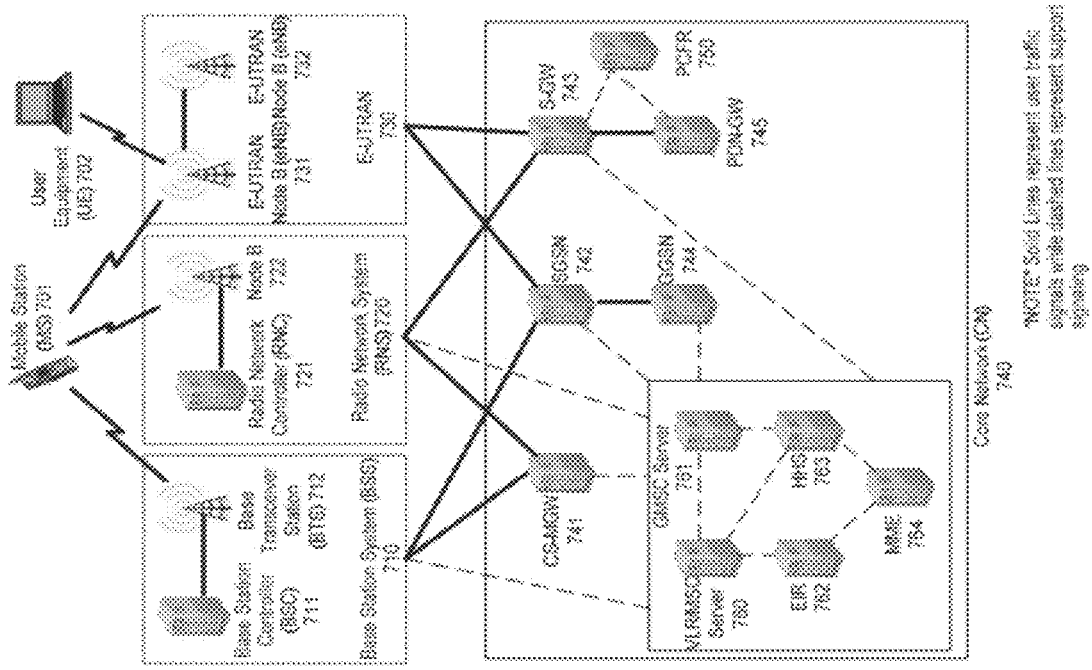
FIG. 7 illustrates a PLMN block diagram view of an exemplary architecture in which the above described embodiments of an event based service may be incorporated.

FIG. 7 illustrates a PLMN block diagram view of an exemplary architecture in which the above described embodiments of an event based service may be incorporated. Mobile Station (MS) 701 is the physical equipment used by the PLMN subscriber. In one illustrative embodiment, communications device 30 may serve as Mobile Station 701. Mobile Station 701 may be one of, but not limited to, a cellular telephone, a cellular telephone in combination with another electronic device or any other wireless mobile communication device.

Mobile Station 701 may communicate wirelessly with Base Station System (BSS) 710. BSS 710 contains a Base Station Controller (BSC) 711 and a Base Transceiver Station (BTS) 712. BSS 710 may include a single BSC 711/BTS 712 pair (Base Station) or a system of BSC/BTS pairs which are part of a larger network. BSS 710 is responsible for communicating with Mobile Station 701 and may support one or more cells. BSS 710 is responsible for handling cellular traffic and signaling between Mobile Station 701 and Core Network 740. Typically, BSS 710 performs functions that include, but are not limited to, digital conversion of speech channels, allocation of channels to mobile devices, paging, and transmission/reception of cellular signals.

Additionally, Mobile Station 701 may communicate wirelessly with Radio Network System (RNS) 720. RNS 720 contains a Radio Network Controller (RNC) 721 and one or more Node(s) B 722. RNS 720 may support one or more cells. RNS 720 may also include one or more RNC 721/Node B 722 pairs or alternatively a single RNC 721 may manage multiple Nodes B 722. RNS 720 is responsible for communicating with Mobile Station 701 in its geographically defined area. RNC 721 is responsible for controlling the Node(s) B 722 that are connected to it and is a control element in a UMTS radio access network. RNC 721 performs functions such as, but not limited to, load control, packet scheduling, handover control, security functions, as well as controlling Mobile Station 701's access to the Core Network (CN) 740.

The evolved UMTS Terrestrial Radio Access Network (E-UTRAN) 730 is a radio access network that provides wireless data communications for Mobile Station 701 and User Equipment 702. E-UTRAN 730 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 730 may include of series of logical network components such as E-UTRAN Node B (eNB) 731 and E-UTRAN Node B (eNB) 732. E-UTRAN 730 may contain one or more eNBs. User Equipment 702 may be any user device capable of connecting to E-UTRAN 730 including, but not limited to, a personal computer, laptop, mobile device, wireless router, or other device capable of wireless connectivity to E-UTRAN 730. The improved performance of the E-UTRAN 730 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 7 is the Enhanced Data rates for GSM Evolution (EDGE). EDGE is an enhancement for GPRS networks that implements an improved signal modulation scheme known as 7-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 701 may communicate with any or all of BSS 710, RNS 720, or E-UTRAN 730. In a illustrative system, each of BSS 710, RNS 720, and E-UTRAN 730 may provide Mobile Station 701 with access to Core Network 740. The Core Network 740 may include of a series of devices that route data and communications between end users. Core Network 740 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 741 is part of Core Network 740, and interacts with Visitor Location Register (VLR) and Mobile-Services Switching Center (MSC) Server 760 and Gateway MSC Server 761 in order to facilitate Core Network 740 resource control in the CS domain. Functions of CS-MGW 741 include, but are not limited to, media conversion, bearer control, payload processing and other mobile network processing such as handover or anchoring. CS-MGW 740 may receive connections to Mobile Station 701 through BSS 710, RNS 720 or both.

Serving GPRS Support Node (SGSN) 742 stores subscriber data regarding Mobile Station 701 in order to facilitate network functionality. SGSN 742 may store subscription information such as, but not limited to, the International Mobile Subscriber Identity (IMSI), temporary identities, or Packet Data Protocol (PDP) addresses. SGSN 742 may also store location information such as, but not limited to, the Gateway GPRS Support Node (GGSN) 744 address for each GGSN where an active PDP exists. GGSN 744 may implement a location register function to store subscriber data it receives from SGSN 742 such as subscription or location information.

Serving Gateway (S-GW) 743 is an interface which provides connectivity between E-UTRAN 730 and Core Network 740. Functions of S-GW 743 include, but are not limited to, packet routing, packet forwarding, transport level packet processing, event reporting to Policy and Charging Rules Function (PCRF) 750, and mobility anchoring for inter-network mobility. PCRF 750 uses information gathered from S-GW 743, as well as other sources, to make applicable policy and charging decisions related to data flows, network resources and other network administration functions. Packet Data Network Gateway (PDN-GW) 745 may provide user-to-services connectivity functionality including, but not limited to, network-wide mobility anchoring, bearer session anchoring and control, and IP address allocation for PS domain connections.

Home Subscriber Server (HSS) 763 is a database for user information, and stores subscription data regarding Mobile Station 701 or User Equipment 702 for handling calls or data sessions. Networks may contain one HSS 763 or more if additional resources are required. Exemplary data stored by HSS 763 include, but is not limited to, user identification, numbering and addressing information, security information, or location information. HSS 763 may also provide call or session establishment procedures in both the PS and CS domains.

The VLR/MSC Server 760 provides user location functionality. When Mobile Station 701 enters a new network location, it begins a registration procedure. A MSC Server for that location transfers the location information to the VLR for the area. A VLR and MSC Server may be located in the same computing environment, as is shown by VLR/MSC Server 760, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 701 registration or procedures for handover of Mobile Station 701 to a different section of the Core Network 740. GMSC Server 761 may serve as a connection to alternate GMSC Servers for other mobile stations in larger networks.

Equipment Identity Register (EIR) 762 is a logical element which may store the International Mobile Equipment Identities (IMEI) for Mobile Station 701. In a typical embodiment, user equipment may be classified as either "white listed" or "black listed" depending on its status in the network. In one embodiment, if Mobile Station 701 is stolen and put to use by an unauthorized user, it may be registered as "black listed" in EIR 762, preventing its use on the network. Mobility Management Entity (MME) 764 is a control node which may track Mobile Station 701 or User Equipment 702 if the devices are idle. Additional functionality may include the ability of MME 764 to contact an idle Mobile Station 701 or User Equipment 702 if retransmission of a previous session is required.

While example embodiments of a security social network have been described in connection with various computing devices/processors, the underlying concepts can be applied to any computing device, processor, or system capable of facilitate a security social network as described herein. The methods and apparatuses for facilitating a security social network, or certain aspects or portions thereof, can take the form of program code (i.e., instructions) embodied in tangible storage media having a physical structure, such as floppy diskettes, CD-ROMs, hard drives, or any other machine-readable storage medium (computer-readable storage medium), wherein, when the program code is loaded into and executed by a machine, such as a computer, the machine becomes an apparatus for implementing a security social network. A computer-readable storage medium, as described herein is an article of manufacture. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for a security social network can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for facilitating a security social network. When implemented on a general-purpose processor, the program code combines with the processor to provide a unique apparatus that operates to invoke the functionality the security social network.

While a security social network has been described in connection with the various embodiments of the various figures, it is to be understood that other similar embodiments can be used or modifications and additions can be made to the described embodiments for facilitating a security social network. For example, one skilled in the art will recognize that using a communications device to facilitate a security social network as described in the present application may apply to any environment, whether wired or wireless, and may be applied to any number of such devices connected via a communications network and interacting across the network. Therefore, a security social network should not be limited to any single embodiment, but rather should be construed in breadth and scope in accordance with the appended claims.

What is claimed:

1. A method comprising:
   determining a geographic boundary of an event based location at which to provide a service;
   determining an event based amount of time for providing the service within the geographic boundary;
   determining that a mobile wireless communications device is located within the geographic boundary;
   providing access to the service via the mobile wireless communications device located within the geographic boundary of the determined event based location and for the determined event based amount of time, wherein the access is limited to the mobile wireless communications device while the mobile wireless communications device is located within the geographic boundary for the determined event based amount of time;
   providing, to the wireless communications device, a notification about available advertising space on a personal auction service; and
   providing access to the personal auction service via the mobile wireless communications device located within the geographic boundary for the determined event based amount of time, wherein the personal auction service provides the ability to bid for advertisement space.

2. The method of claim 1, wherein the event based location is proximate to the event.

3. The method of claim 1, wherein the event is at least one of a sporting event, an entertainment event, transportation departures, transportation arrivals, a marketing event, or a parade.

4. The method of claim 1, further comprising providing, to a wireless communications device, a notification about an available service.

5. The method of claim 1, further comprising providing, to a wireless communications device, an indication of upcoming event based location services.

6. An apparatus comprising:
   a processor; and
   memory coupled to the processor, the memory comprising executable instructions that when executed by the processor cause the processor to effectuate operation comprising:
   determining a geographic boundary of an event based location at which to provide a service;
   determining an event based amount of time for providing the service within the geographic boundary;
   determining that a mobile wireless communications device is located within the geographic boundary;
   providing access to the service via the mobile wireless communications device located within the geographic boundary of the determined event based location and for the determined event based amount of time, wherein the access is limited to the mobile wireless communications device while the mobile wireless communications device is located within the geographic boundary for the determined event based amount of time;
   providing to the wireless communications device, a notification about available advertising space on a personal auction service; and
   providing access to the personal auction service via the mobile wireless communications device located within the geographic boundary for the determined event based amount of time, wherein the personal auction service provides the ability to bid for advertisement space.

7. The apparatus of claim 6, wherein the event based location is proximate to the event.

8. The apparatus of claim 6, wherein the event is at least one of a sporting event, an entertainment event, transportation departures, transportation arrivals, a marketing event, or a parade.

9. The apparatus of claim 6, the operations further comprising:
   providing to a wireless communications device, a notification about an available service.

10. The apparatus of claim 6, the operations further comprising:
    providing to a wireless communications device, an indication of upcoming event based location services.

11. A computer-readable storage medium, that is not a propagating signal, the computer-readable storage medium comprising computer-executable instructions, that when executed by a processor cause the processor to effectuate operations comprising:
    determining a geographic boundary of an event based location at which to provide a service;
    determining an event based amount of time for providing the service within the geographic boundary;
    determining that a mobile wireless communications device is located within the geographic boundary;
    providing access to the service via the mobile wireless communications device located within the geographic boundary of the determined event based location and for the determined event based amount of time, wherein the access is limited to the mobile wireless communications device while the mobile wireless communications device is located within the geographic boundary for the determined event based amount of time;
    providing to the wireless communications device, a notification about available advertising space on a personal auction service; and
    providing access to the personal auction service via the mobile wireless communications device located within the geographic boundary for the determined event based amount of time, wherein the personal auction service provides the ability to bid for advertisement space.

12. The storage medium of claim 11, wherein:
    the event is at least one of a sporting event, an entertainment event, transportation departures, transportation arrivals, a marketing event, or a parade; and
    the event based location is proximate to the event.

13. The storage medium of claim 11, the operations further comprising:
    providing to a wireless communications device, a notification about an available service.

14. The storage medium of claim 11, the operations further comprising
    providing to a wireless communications device, an indication of upcoming event based location services.

* * * * *